United States Patent
Bose et al.

(10) Patent No.: US 12,020,197 B2
(45) Date of Patent: Jun. 25, 2024

(54) EVENT-DRIVEN ENHANCEMENT OF EVENT MESSAGES

(71) Applicant: Rakuten Mobile, Inc., Tokyo (JP)

(72) Inventors: Jyoti Bose, Mumbai (IN); Mihirraj Narendra Dixit, Tokyo (JP); Surender Singh Lamba, Tokyo (JP); Abhishek Sharma, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 370 days.

(21) Appl. No.: 17/644,590

(22) Filed: Dec. 16, 2021

(65) Prior Publication Data

US 2023/0196257 A1    Jun. 22, 2023

(51) Int. Cl.
| | |
|---|---|
| *G06F 16/00* | (2019.01) |
| *G06F 9/54* | (2006.01) |
| *G06F 16/2455* | (2019.01) |
| *G06F 16/25* | (2019.01) |
| *G06Q 10/067* | (2023.01) |

(52) U.S. Cl.
CPC .......... *G06Q 10/067* (2013.01); *G06F 9/542* (2013.01); *G06F 9/546* (2013.01); *G06F 16/24552* (2019.01); *G06F 16/258* (2019.01)

(58) Field of Classification Search
CPC . G06Q 10/067; G06F 16/24552; G06F 9/546; G06F 9/542
See application file for complete search history.

(56) References Cited

U.S. PATENT DOCUMENTS

| | | | |
|---|---|---|---|
| 7,003,560 B1 * | 2/2006 | Mullen | G06Q 10/06 709/224 |
| 9,483,335 B1 * | 11/2016 | Wagner | G06F 9/45533 |
| 2006/0004745 A1 * | 1/2006 | Kuhn | G06Q 10/10 |
| 2020/0162308 A1 * | 5/2020 | Makovsky | H04L 41/0663 |

* cited by examiner

*Primary Examiner* — Cheryl Lewis
(74) *Attorney, Agent, or Firm* — HAUPTMAN HAM, LLP (57) ABSTRACT

A system includes processing circuitry and a memory connected to the processing circuitry. The memory is configured to store executable instructions that, when executed by the processing circuitry, facilitate performance of operations. The operations include filtering, based upon business logic, business data within a cache database. Converting the filtered business data into a data model. Loading the data model to a persistent cache database. Obtaining event messages from a data source, where the event messages are generated by one or more state changes within a network operatively connected to the system. Obtaining, for an event message, event-related data from the data model, where the event-related data is topologically related to the event message. Combining the event message with the event-related data from the data model. Framing the event message with the event-related data; and route the frame according to a user-defined configuration file.

20 Claims, 5 Drawing Sheets

EVENT-DRIVEN ENHANCEMENT OF EVENT MESSAGES

BACKGROUND

Event-driven architecture (EDA) is a software architecture paradigm promoting the production, detection, consumption of, and reaction to events. An event is defined as a change in state or an annotated label based on an entities log output in a system. For example, when a consumer purchases an online product, the product's state changes from "for sale" to "sold". A seller's system architecture treats this state change as an event whose occurrence is made known to other applications within the architecture. What is produced, published, propagated, detected or consumed is a message called the event notification, and not the event, which is the state change that triggered the message emission. Events do not travel, that is, events occur. Event messages do travel, that is, event messages are propagated to report the event that occurred. Events occur, but event messages are generated. Nevertheless, the term event is often used metonymically to denote the notification event message. The EDA is often designed atop message-driven architectures, where such a communication pattern includes one of the inputs to be text-based (e.g., the message) to differentiate how each communication should be handled.

On the fly is a phrase used to describe something that is being changed while the process that the change affects is ongoing. In computing, on the fly is used in programming to describe changing a program while the program is still running.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

DETAILED DESCRIPTION

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features be formed between the first and second features, such that the first and second features not be in direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In some embodiments, a daemon process formats event message frame(s) with additional data or enriches the data within the event message frame(s) with additional data. In multitasking computer operating systems, a daemon process is a computer program that functions as a background process rather than being under the direct control of an interactive user. Systems often start daemon processes at boot time that will respond to network requests, hardware activity, or other programs by performing a task. Data enrichment or augmentation is the process of enhancing existing information by supplementing missing, incomplete, or additional data. In some embodiments, data enrichment is configured to use multiple and various data sources (such as online data sources, offline data sources, streaming data sources, and/or batch data sources). In large companies with multiple disparate systems and fragmented information unusually have multiple and varying sources of information. Framing is a technique to place data into discernible blocks of information. In some embodiments, framing is a way for a sender (e.g., a data source) to transmit a set of bits that are meaningful to the receiver (e.g., a data sink).

In programming and software design, an event is a change of state (e.g., an action or occurrence) recognized by software, often originating asynchronously from the external environment that is handled by the software. Computer event messages are generated or triggered by a system, by a user, or in other ways based upon the event. Event messages are handled synchronously with the program flow; that is, the software is configured to have one or more dedicated places (e.g., a data sink) where event messages are handled. A source of event messages includes the user, who interacts with the software through the computer's peripherals; for example, by typing on a keyboard. Another source is a hardware device such as a timer. Software is configured to further trigger the software's own set of event messages into the event channel (e.g. to communicate the completion of a task). Software that changes behavior in response to event messages is said to be event-driven, often with the goal of being interactive.

In some embodiments, an event enricher is a daemon service that loads business data into a shared cache in Eager mode (e.g., all on one query in contrast to Lazy mode). In some embodiments, an event gate is a pluggable data adaptor that connects with multiple types of data sources to collect data, such as event messages, process the event messages into frames, and forward the event message frame(s) to the event enricher. In some embodiments, event messages are collected via a data stream, batch data, online data, and offline data. In some embodiments, the event gate frames collected event messages based on business logic stored in a master database. In computer software, business logic or domain logic is the part of a software program that encodes the real-world business rules that determine how data is created, stored, and changed. Business logic is contrasted with the remainder of the software program, such as the technical layer or service layer that is concerned with lower-level details of managing a database or displaying the user interface, system infrastructure, or generally connecting various parts of the program.

The event gate is a data adapter and functions as a bridge between a data source and a disconnected data class, such as a data set. In some embodiments, the event gate supplies collected and framed event messages to an event enricher that enriches the framed event messages with additional related or topological data and then routes the framed event messages based on a user-defined configuration. At the simplest level the data adapter will specify structured query language (SQL) commands that provide create, read, update, and delete (CRUD) functionality. At a more advanced level data adaptors offer the functions required in order to create strongly typed data sets, including data relations. In addition to data adapters, the event enricher includes connection objects, data reader objects, and command objects. The event gate is used to exchange data between a data source and the event enricher. In many applications, this means reading data from a database into a dataset, and then writing changed data from the dataset to the event enricher.

In some embodiments, Eager mode, or Eager loading, makes a single query on a database and loads the related entities based upon the query. This is in contrast to Lazy mode that makes multiple database queries to load the related entities. Cache sharing allows each data cache to share the data cache contents with the other caches and avoid duplicate caching.

In some embodiments, the event gate connects with data sources to collect data in a stream. In some embodiments, the data sources are transmission control protocol (TCP) based data sources. A stream is thought of as items on a conveyor belt being processed one at a time rather than in large batches. Streams are processed differently from batch data. Normal functions do not operate on streams as a whole as the streams have potentially unlimited data; streams are co-data (potentially unlimited), not data (which is finite). Functions that operate on a stream, producing another stream, are known as filters, and are connected in pipelines, analogous to function composition. Filters operate on one item of a stream at a time, or base an item of output on multiple items of input, such as a moving average. Computerized batch processing is processing without end user interaction, or processing scheduled to run as resources permit.

In some embodiments, an event enricher applies business data to event message(s) within event message frame(s) received from an event gate. In some embodiments, the event enricher enriches the event message frame(s) in real time, by supplementing or adding additional business related data. In some embodiments, the event enricher distributes or routes the enhanced event message frame(s) to a downstream process. In some embodiments, the enriched event message frame(s) are produced over a real-time messaging queue or other suitable communication protocol in accordance with some embodiments. Real-time or real time describes operations in computing or other processes that guarantee response times within a specified time (deadline), usually a relatively short time. A real-time process is generally one that happens in defined time steps of maximum duration and fast enough to affect the environment in which the real-time process occurs, such as inputs to a computing system. In computer science, message queues and mailboxes are software-engineering components typically used for inter-process communication (IPC), or for inter-thread communication within the same process. Message queues use a queue for messaging; the passing of control or of content. In a computer network, downstream refers to data sent from a provider to a consumer. One process sending data primarily in the downstream direction is downloading. In some embodiments, downstream refers to the direction from a shared queue to an event consumer.

In some embodiments, the event enricher compartmentalizes a business layer and a technical layer, where the business layer continues to define new use cases and the technical layer applies those business new use cases in real time on the event message frame(s). The business layer contains business logic that contains custom rules or algorithms that handle the exchange of information between a database and a user interface. Business logic is the part of a computer program that contains the information (i.e., in the form of business rules) that defines or constrains how a business operates. Such business rules are operational policies that are usually expressed in true or false binaries. Business logic is seen in the workflows that the business logic supports, such as in sequences or steps that specify in detail the proper flow of information or data, and therefore decision-making. Business logic is further known as domain logic. The technical layer is used to model the technology architecture of an enterprise. The technical layer is the structure and interaction of the platform services, and logical and physical technology components.

Enterprise software, further known as enterprise application software (EAS), is computer software used to satisfy needs of an organization rather than individual users. EAS is one example of EDA software. Such organizations include businesses, schools, interest-based user groups, clubs, charities, and governments. Enterprise software is a part of a (computer-based) information system; a collection of such software is called an enterprise system. These systems handle a chunk of operations in an organization with the aim of enhancing the business and management reporting tasks. The systems process the information at a relatively high speed and deploy the information across a variety of networks. Services provided by enterprise software are typically business-oriented tools, such as online shopping, and online payment processing, interactive product catalogue, automated billing systems, security, business process management, enterprise content management, information technology (IT) service management, customer relationship management, enterprise resource planning, business intelligence, project management, collaboration, human resource management, manufacturing, occupational health and safety, enterprise application integration, and enterprise forms automation.

In some embodiments, the business layer and the technical layer are separated. In some embodiments, the event enricher supports the separation of the business layer and the technical layer. In some embodiments, the separation of the business layer and the technical layer supports quicker implementation of new business use models or rules. In some embodiments, the event enricher reduces the time to implement new business use solutions and reduces the cost of development by allowing code reuse.

In some embodiments, based on business logic the collected event messages are grouped into frames. Frames are an artificial intelligence data structure used to divide knowledge into substructures by representing stereotyped situations. Frames are the primary data structure used in artificial intelligence frame language. Frames are stored as ontologies of sets. In computer science and information science, an ontology encompasses a representation, formal naming and definition of the categories, properties and relations between the concepts, data and entities that substantiate one, many, or all domains of discourse. An ontology is a way of showing the properties of a subject area and how the properties are related, by defining a set of concepts and categories that represent the subject. Frames are further an extensive part of knowledge representation and reasoning schemes. Structural representations assemble facts about a particular object and event message types and arrange the event message types into a large taxonomic hierarchy.

In some embodiments, the behavior of the event enricher is modified on the fly without changing software code or stopping the server. In some embodiments, the event enricher is configured to switch between many data sources and data sinks. In computing, a sink, event sink or data sink is a class or function designed to receive incoming event messages from another object or function.

An EDA architectural pattern is applied by the design and implementation of applications and systems that transmit event messages among loosely coupled software components and services. An event-driven system typically consists of event emitters (or agents, data sources), event consumers (or sinks), and event channels (or the medium the event messages travel from emitter to consumer). Event emitters detect, gather, and transfer event messages. An event emitter does not know the consumers of the event messages, the event emitter does not even know if an event consumer exists, and in case the event consumer exists, the event emitter does not know how the event message is used or further processed. Event consumers apply a reaction as soon as an event message is presented. The reaction is or is not completely provided by the event consumer. For example, the event consumer filters the event message frame(s) while the event formatter and router transforms and forwards the event message frame(s) to another component or the event consumer supplies a self-contained reaction to such event message frame(s). Event channels are conduits in which event message frame(s) are transmitted from event emitters to event consumers. In some embodiments, event consumers become event emitters after receiving event message frame(s) and then forwarding the event message frame(s) to other event consumers. The configuration of the correct distribution of event message frame(s) is present within the event channel. The physical implementation of event channels is based on components, such as message-oriented middleware or point-to-point communication, which might rely on a more appropriate transactional executive framework (such as a configuration file that establishes the event channel).

Event driven service-oriented architecture (SOA) combines the intelligence and proactiveness of EDA with the organizational capabilities found in service offerings. Before event-driven SOA, the typical SOA platform orchestrated services centrally, through pre-defined business processes, assuming that what should have already been triggered is defined in a business process. This other approach does not account for event message frame(s) that occur across, or outside of, specific business processes. Thus complex event message frame(s), in which a pattern of activities, both non-scheduled and scheduled, are not accounted for in other approaches.

Other EDA or SOA approaches are not configured to support a single solution for several or multiple types of data, data collectors, or data sources. Further, other EDA or SOA approaches do not support collecting data in both data streams and in batch data.

Other EDA or SOA approaches do not have a business layer to group data based on business logic. In some embodiments, the software code and configuration to use the service layer are separated. In SOA, the service layer is a layer in a multi-layer-abstraction-layer model. The model consists of an object layer, component layer, service layer, process layer and enterprise layer. The service layer is considered as a bridge between the higher and lower layers, and is characterized by a number of services that are carrying out individual business functions. In some embodiments, the service layer interprets the configuration file and creates multiple event gates (e.g., data adapters) based on the received configuration file. In some embodiments, event gates abstract a data source and data sink and support a faster solution of the data compared to other approaches.

Figure 1:
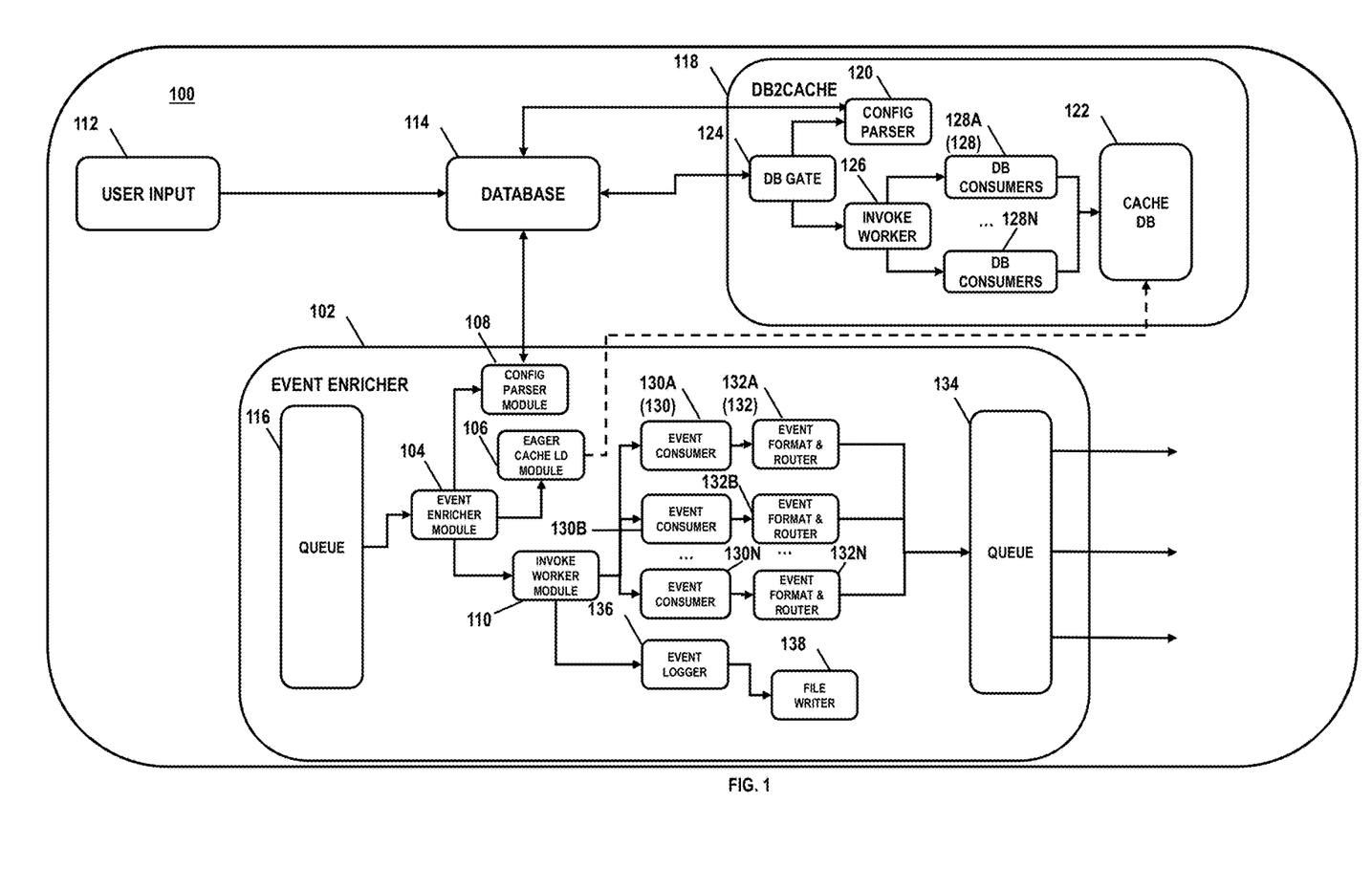
FIG. 1 is a flow diagram representation of an event enricher system, in accordance with some embodiments.

FIG. 1 is a flow diagram representation of an event enricher system 100, in accordance with some embodiments.

Event enricher system 100 includes an event enricher 102 that includes an event enricher module 104, Eager cache loader module 106, configuration parser module 108, and invoke worker module 110. Event enricher system 100 is a software application that programmatically understands relationships. Event enricher system 100 is used in systems management tools to aggregate, normalize and analyze event log data, using predictive analytics and fuzzy logic to alert the systems administrator when there is a problem. In some embodiments, event enricher system 100 is a part of an EDA or SOA platform.

In some embodiments, a service layer of event enricher system 100 creates multiple event enrichers 102 based on a received user-defined configuration file inputted by a user at user input 112. In some embodiments, user input (UI) 112 (e.g., human-machine interface) is the part of event enricher 102 that handles human-machine interaction. Additionally or alternatively, UI 112 is a membrane switch, rubber keypad or touchscreen. In some embodiments, UIs are composed of one or more layers, including a human-machine interface (HMI) that interfaces machines with physical input hardware such as keyboards, mice, or game pads, and output hardware such as computer monitors, speakers, and printers. In some embodiments, UI 112 is a graphical user interface (GUI), which is composed of a tactile UI and a visual UI capable of displaying graphics. Additionally or alternatively, sound is added to the GUI for a multimedia user interface (MUI).

In some embodiments, event enricher(s) 102 enrich incoming event message frame(s). In some embodiments, event enricher(s) 102 further qualify and classify, within event formatter and router(s) 132, the event message frame(s) based on the user-defined policy (i.e., the configuration file). In some embodiments, event enricher 102 is pluggable in nature. In computing, a plug-in (or plugin, add-in, addin, add-on, or addon) is a software component that adds a specific feature to an existing computer program and enables customization. In some embodiments, event enricher(s) 102 are scalable and are configured to be scaled in every use. In some embodiments, event enricher(s) 102 quickly enrich event message frame(s) based on multi-layer caching. In computing, a cache is a hardware or software component that stores data so that future requests for that data can be served faster. The data stored in a cache is the result of an earlier computation or a copy of data stored elsewhere. Cache hits are served by reading data from the cache, which is faster than re-computing a result or reading from a slower data store; thus, the more requests that are served from the cache, the faster the system performs.

Event enricher module 104 is the master process within event enricher(s) 102 and responsible for initiating configuration parser module 108 and invoke worker module 110. In some embodiments, event enricher module 104 delegates tasks, based upon the user-defined configuration file, retrieved by configuration parser module 108. Event enricher module 104 then delegates all tasks to all other modules within event enricher(s) 102. In some embodiments, the startup of configuration parser module 108 and invoke worker module 110 is performed sequentially. In some embodiments, the startup is performed concomitantly. Event enricher module 104 further receives event message frame(s) from a queue 116. In some embodiments, the event message frame(s) are provided by one or more event gates upstream of event enricher(s) 102. Event message frame(s) are from online data sources, offline data sources, streaming data sources and batch data sources In some embodiments, event enricher(s) 102 begin operation as a daemon process and loads cache database 118 with business logic defined in master database 114. A cache database is a system that caches (e.g., saves) results from a database, in order to return the result faster next time. There are two types of database cache: (1) an internal cache that keep results ready that that internal cache thinks the user might need based on usage patterns. (2) A query cache stores results when a query is made more than once (e.g., for instance for a configuration file) and the result is cached and returned from random access memory (RAM). When the RAM runs out, the least recently used query is deleted to make space for new ones. When the underlying data changes, either on a table or row/document level, depending on the database, the cache is cleared.

Master database 114 is the configuration database storing the user-defined configuration file in a structured query language (SQL) server. Master database 114 contains information on all the databases that exist on the server(s), including the physical database files and their locations. Master database 114 further contains SQL server's configuration settings and login account information. The following list outlines the information contained in master database 114: (1) server registrations and remote logins, (2) local databases and database files, (3) login accounts, (4) processes and locks, (5) server(s) configuration settings.

In some embodiments, the business data received from master database 114 is converted into a data model by cache database 118, based upon the user defined configuration file obtained by configuration parser module 120 that is loaded into a persistent cache 122. A data model is an abstract model that organizes elements of data and standardizes how the elements of data relate to one another and to the properties of real-world entities. For example, a data model may specify that the data element representing an event be composed of a number of other elements which, in turn, represent the where and when the event occurred and define the event's owner. The term data model refers to two distinct but closely related concepts. In some embodiments, data model refers to an abstract formalization of objects and relationships found in a particular application domain. For example, customers, products, and orders found in a manufacturing organization. At other times data model refers to the set of concepts used in defining such formalizations. For example, concepts such as entities, attributes, relations, or tables.

Persistent cache 122 is information stored in permanent memory, so data is not lost after a system restart or system crash as the data would be if the data was stored in cache memory. In some embodiments, the data in persistent cache 122 is queried by event consumers 130 through Eager cache load module 106.

In some embodiments, database gate module 124 receives data from one or more databases including master database 114 containing business logic and business data. In some embodiments, based on the user-defined configuration file forwarded by configuration parser module 120, database gate module 124 instructs invoke worker module 126 to create one or more database consumer module(s) 128A, 128N (where N is a non-negative integer) (hereinafter database consumer module 128). In some embodiments, database consumers frame data (such as a data model) and send to persistent cache 122.

In some embodiments, within event enricher(s) 102 configuration parser module 108 queries master database 114 for the user-defined configuration file. In some embodiments, the user-defined configuration file is related to technical aspects regarding the data sources, data sinks, and the parameters for event message frame enrichment that are passed downstream. In some embodiments, event enhancer module 104 is configured to parse the configuration file to all other modules within even enhancer 102. In some embodiments, based on the configuration file, invoke worker module 110 spawns one or more event consumer(s) 130A, 130B, and 130N (where N is a non-negative integer (hereinafter referenced as event consumers 130). In some embodiments, the configuration file includes a predefined data source and data sink. In some embodiments, the configuration file is inputted, modified, and controlled by a user through user input 112. In some embodiments, the user inputs, modifies, and controls the configuration file in real time. In some embodiments, master database 114 and/or user input 112 are located within a correlation engine and policy manager (CPE).

In some embodiments, based on a number of data sources and data sinks configuration parser module 108 forwards to invoke worker module 110 an instruction to spawn multi-processing workers or event consumers 130 on each core of a system with a shared queue 134. In some embodiments, core refers to a central processing unit (CPU), further called a central processor, main processor or just processor and is the electronic circuitry that executes instructions comprising a computer program. In some embodiments, the core is processing circuitry 502 of FIG. 5. The core performs basic arithmetic, logic, controlling, and input/output (I/O) operations specified by the instructions in a program. In some embodiments, the system is a group of computers or cores that are linked and function together, such as a computer network or computer cluster. In some embodiments, shared queue 134 is for data sharing between event consumers 130.

In some embodiments, configuration parser module 108 is a data model parser that parses the configuration file. The data model parser is primarily a parsing library and not a validation library. In other words, the data model parser assures the types and constraints of the output model, not the input data based on the configuration file. In some embodiments, all parameters are obtained and set based upon the configuration file. In some embodiments, the configuration file details all read, write and execute permissions for event enricher module 104, invoke worker module 110 and event consumers 130.

In some embodiments, event consumers 130 write event message frame(s) to event formatter and router modules 132A, 132B, and 132N (where N is a non-negative integer) (hereinafter referred to as event formatter and router modules 132). In some embodiments, the business logic retrieved from cache database 118 by Eager cache loader module 106 is applied to event message frame(s) already containing framed event message frame(s) by event formatter and router modules 132. In some embodiments, the event message frame(s) are enriched or supplemented with the business logic and thus present more information within the event message frame(s) regarding the event message(s). In some embodiments, event formatter and router modules 132 perform the enrichment and classify the event message frame(s) as per the configuration file. In some embodiments, event formatter and router(s) 132 format particular event message frame(s) to a readable format for a data sink to consume. In some embodiments, event formatter and router(s) 132 route the enhanced event message frame(s) as provided by the configuration file.

In some embodiments, the event formatter and router modules 132 distribute the newly enhanced event message frame(s) downstream for further processing. In some embodiments, any change made to the business logic or configuration file, for example by a user at user input 112, is made in real time, on the fly, and reflected in persistent cache 122. In some embodiments, the updated business logic is applied to all upcoming event message frame(s) in real time.

In some embodiments, a unique event identification is added to every event message frame. In some embodiments, every event consumer 130 has a unique identification. In some embodiments, one or more event consumers 130 are disabled, refreshed or suspended based upon the unique identification. In some embodiments, each event consumer 130 allows for multiple data sources and customized configurations. In some embodiments, based on the configuration file, event consumers 130 will consume event messages from the configuration file designated data source and send the event message to the data sink; shared queue 134.

In some embodiments, shared queue 134 is an asynchronous messaging library, aimed at use in distributed or concurrent applications. In some embodiments, shared queue 134 provides a message queue, but unlike message-oriented middleware, a shared queue 134 runs without a dedicated message broker. In some embodiments, each event consumer 130 includes a data source and data sink definition to which the event consumer 130 attaches read and write data.

In some embodiments, event logger 136 reads shared queue 134 that is populated by event consumers 130 and logs the information to a file. In some embodiments, file writer 138 writes logs of event enricher 102 to a file. In some embodiments, file writer 138 maintains rolling logs based on timestamp and size. Event enricher system 100 is used in systems management tools to aggregate, normalize and analyze the event log data, using predictive analytics and fuzzy logic to alert the systems administrator when there is a problem.

Figure 2:
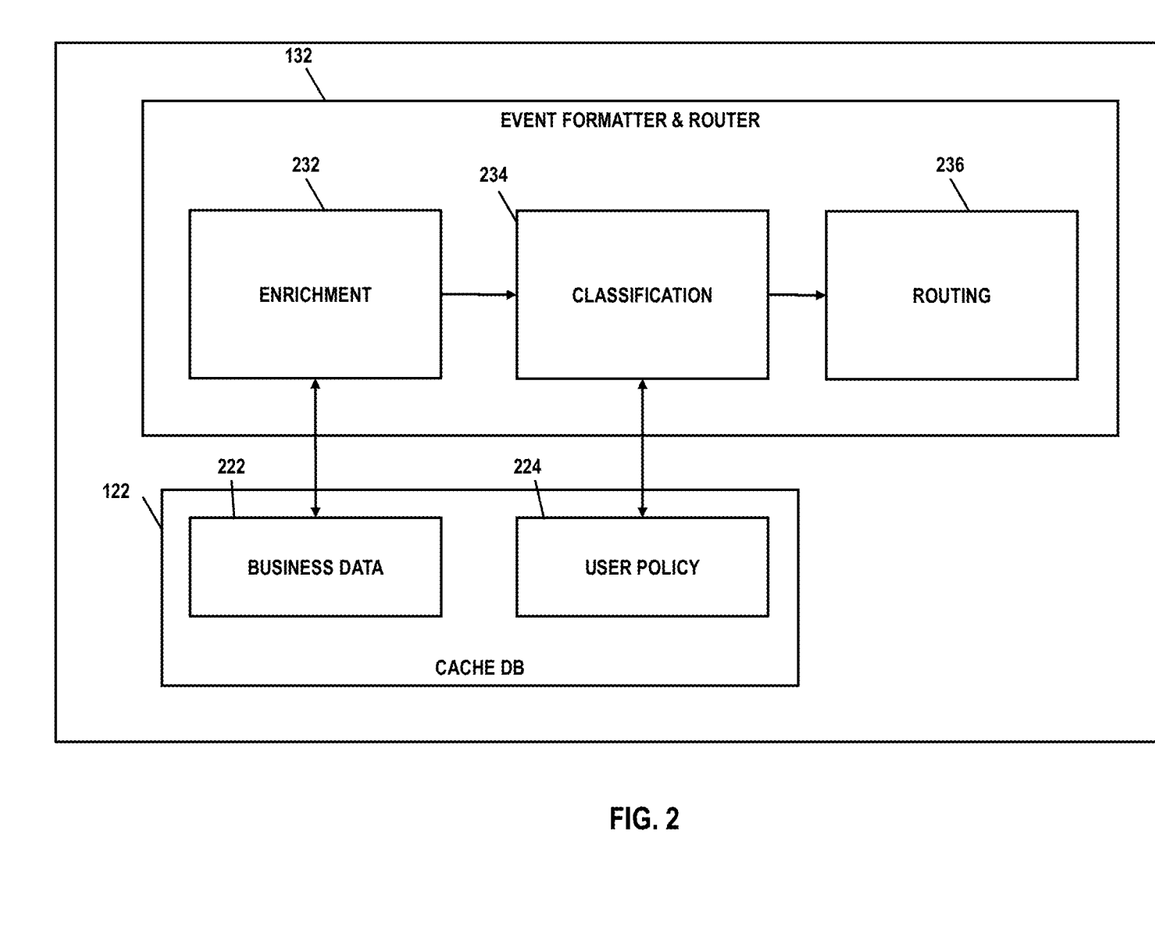
FIG. 2 is a pictorial representation of an event formatter and router, in accordance with some embodiments.

FIG. 2 is a pictorial representation of an event formatter and router, in accordance with embodiments of the present invention.

In FIG. 2, reference numbers from FIG. 1 are reused for similar elements from FIG. 1 for the sake of brevity and clarity. This is not to say the embodiments of FIG. 1 and FIG. 2 are the same as these figures differ and the different elements are renumbered with new reference numerals.

In some embodiments, event formatter and router module 132 performs enriching of event message frame(s), classification of event message frame(s), and routing of the event message frame(s). In some embodiments, event formatter and router module 132 enriches or adds any additional information to event message frame(s) that are consumed by event consumer(s) 130.

In some embodiments, enrichment sub-module 232 queries persistent cache 122 for additional data and/or attributes from business data 222 of persistent cache 122 and applies the received additional data to the event message frame(s). In some embodiments, business data layer 222 is any entity or partition of persistent cache 122 that supplies data to the existing event message frame(s).

In a non-limiting example, in response to an active inventory supplying the latest topological data, the topological data is incorporated into business data layer 222. The topological data then gets added to existing event message frame(s) as the event message frame(s) pass through enrichment sub-module 232 as defined by user policy 224 within the configuration file. Once the event message frame(s) are enriched the event message frame(s) are passed to classifier sub-module 234.

In another non-limiting example, in response to event message frame(s) received from a network service user policy 224 instructs enrichment sub-module 232 to take action on the network function. Topological data related to the network functions for the network service are added to the event message frame(s) to enrich the event.

In engineering, a network function (further known as system function or transfer function) of an electronic or control system component is a mathematical function which theoretically models the device's output for each possible input. This function is a two-dimensional graph of an independent scalar input versus the dependent scalar output, called a transfer curve or characteristic curve. Network functions for components are used to design and analyze systems assembled from components, particularly using the block diagram technique, in electronics and control theory. The dimensions and units of the network function model the output response of the device for a range of possible inputs. For example, the network function of a two-port electronic circuit like an amplifier might be a two-dimensional graph of the scalar voltage at the output as a function of the scalar voltage applied to the input; the network function of an electromechanical actuator might be the mechanical displacement of the movable arm as a function of electrical current applied to the device; the network function of a photodetector might be the output voltage as a function of the luminous intensity of incident light of a given wavelength.

In some embodiments, for a particular set of user policy based filters, classifier sub-module 234 determines whether event message frame(s) are part of a particular policy or not. In some embodiments, the user policy filters help in identifying the event message frame(s) with respect to user policy 224. In some embodiments, the filtering is performed in order to make sure user policy 224 has been applied for a particular entity message frame(s) having set number of filters.

In a non-limiting example, a user policy (e.g., P1) is applicable for a set of domains (e.g., a radio access network (RAN), CORE (the high capacity communication facility that connects primary communications nodes)) and a location (e.g., Tokyo, Kanagawa, and Nagoya) that takes action on an entity message frame. In some embodiments, P1 is a set of filters for a network function. In response to an event message frame received at the network function that arrives in a stream, based on the business data layer, the business data entity [network function] is identified as entity message frame that belongs to location: [e.g., Chiba]. However, since the policy wants to take action on entities that belong to locations (Tokyo, Kanagawa, and Nagoya) and not location (Chiba), this event message frame will be classified as not part of policy P1.

In another non-limiting example, the user defines a user policy for all locations: with a regular expression (regex) that considers all the locations. Any event for any location will be classified as part of this policy considering only a single filter of location. In response to there being more filters, these other filters are applied over existing filters as shown in equation (1).

$$\text{Event message frame} \rightarrow \text{User Policy[Filter 1,Filter 2,Filter 3]} \qquad \text{eq. (1)}$$

In some embodiments, after all user policy filters are satisfied with the enriched event information, that event message frame is considered as part of that policy. In some embodiments, a single event message frame is part of multiple such policies as well.

In some embodiments, after the event message frame(s) are classified, router sub-module 236 routes the enriched event message frame(s) based upon user policy 224.

Figure 3:
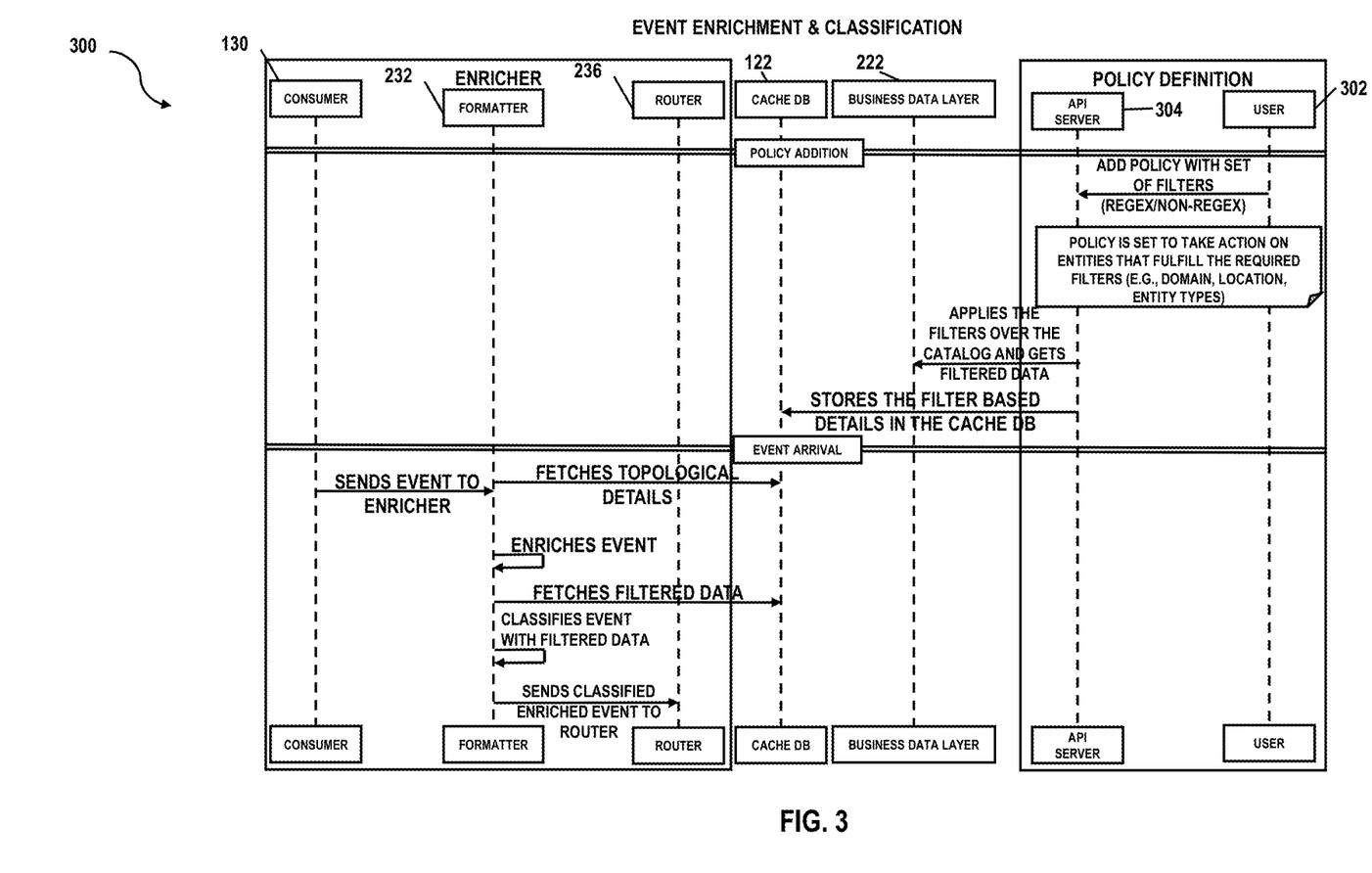
FIG. 3 is a flow diagram for a method of implementing an event enricher and classifier, in accordance with some embodiments.

FIG. 3 is a flow diagram for a method of implementing an event enricher and classifier 300, in accordance with some embodiments.

In FIG. 3, reference numbers from FIG. 1 and FIG. 2 are reused for similar elements from FIG. 1 and FIG. 2 for the sake of brevity and clarity. This is not to say the embodiments of FIG. 1, FIG. 2 and FIG. 3 are the same as these figures differ and the different elements are renumbered with new reference numerals.

In some embodiments, user 302 creates and add a user policy. In some embodiments, the user policy includes one or more filters (e.g., regex and non-regex). In some embodiments, user 302 incorporates the user policies to business data layer 222 through an application programming interface (API) server 304. An API is a connection between computers or between computer programs. API is a type of software interface, offering a service to other pieces of software. In contrast to a user interface, which connects a computer to a person, an application programming interface connects computers or pieces of software to each other. The user interface is not intended to be used directly by a person (the end user) other than a computer programmer who is incorporating the user interface into software. In some embodiments, API server 304 applies the filters within the user policy to business data layer 222 and obtains the filtered data.

In a non-limiting example, a user 302 creates and applies a policy to take an action on entities from locations which begin with letter "T". Continuing with the example, user 302 applies the regex as (^T.*) for matching all the locations which begin with letter "T". The regex is queried in the business data layer for example: [Catalog] which returns all the locations within [Catalog] that match the regex.

In some embodiments, the returned list is filtered data. In some embodiments, the filtered data is stored in cache database 122 for the user-defined policy. In some embodiments, whenever event message frame(s) arrive, cache database 122 will fetch all the topological data including location data. The location is then mapped against the available location from the filtered data for the policy present in cache database 122.

In some embodiments, responsive to the entity present in the event message frame(s) matches the location with respect to filtered data, the event message frame(s) are classified as part of the policy. The enriched and classified event will be sent to router 236.

In some embodiments, event message frame(s) that are part of a particular routing policy are sent to a particular sink. In some embodiments, the data sink is determined based on the routing policy established by user 302.

In another non-limiting example, a routing policy, in equation (2), is defined to group all the event message frame(s) based on the topological root and the policy name defined by user.

$$\text{Routing Policy 1} \rightarrow \text{Topological Root: Network Service,Policy: } P1 \qquad \text{eq. (2)}$$

In some embodiments, an event message frame(s) that has a topological root with network service and is classified as part of P1 is sent to a particular sink partition. In some embodiments, the partitioning of event message frame(s) based on routing policy ensures that a set of events are driven to a defined sink. In some embodiments, this ensures that event message frame(s) are computed at the sink end in a sequential manner to avoid parallel processing between the sinks. In some embodiments, this avoids unnecessary usage and locking of shared data between the sinks.

In some embodiments, consumer module 130 sends an event message frame(s) to enricher 232. In some embodiments, enricher 232 obtains topological data regarding the event message frame(s) from cache database 122. In some embodiments, enricher 232 then enriches the event message frame(s) with the topological data returned from cache database 122.

In some embodiments, enricher 232 obtains filtered data from cache database 122. In some embodiments, classifier 234 classifies the event message frame(s) with the filtered data. In some embodiments, classifier 234 sends the classified enriched event message frame(s) to router 236.

Figure 5:
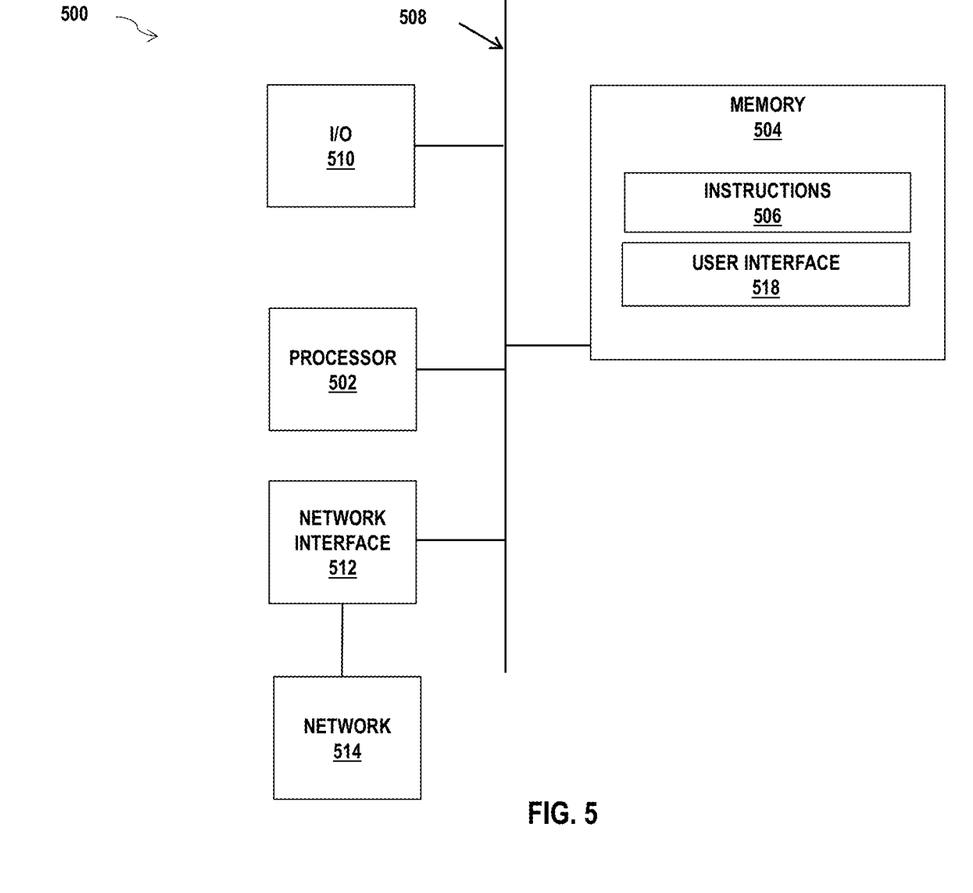
FIG. 5 is a high-level functional block diagram of a server-cluster reconfiguration processor-based system, in accordance with some embodiments.

In another non-limiting example, a user, through user input 112 or any other user interface, such as user interface 518 of event enhancer processing system 500, inputs one or more policies that are configured to take action on one or more entities. In some embodiments, the user inputs the policies through a wired user input or a wireless user input. In some embodiments, a policy action manager is entirely pluggable and configured as a data sink. In some embodiments, a policy definition manager is configured to implement policies, add and remove data sources, add and remove data sinks, and configure data layers and/or the technical layers. In some embodiments, the user has functional control over the policy definition manager and is able to implement user policies through the policy definition manager.

Continuing with the non-limiting example, the policies set by the user take action on entities that satisfy the filters established by the user through the policies. In some embodiments, filter are configured to apply to domains, locations, entity types, cores, and other entities contemplated within the scope of the disclosure. In some embodiments, an API server applies the user defined filters over the catalog and obtains filtered data. In some embodiments, the catalog is a database catalog that consists of metadata in which definitions of database objects such as base tables, views (virtual tables), synonyms, value ranges, indexes, users, and user groups are stored. The SQL standard specifies a uniform means to access the catalog, called the INFORMATION_SCHEMA, but not all databases follow this, even if they implement other aspects of the SQL standard.

Continuing with the non-limiting example, the filtered data is stored in the cache database. In some embodiments, cache database is configured for filtering and allowing SQL base query sort structures. In some embodiments, the event consumer sends one or more event message frame(s) to the formatter. In some embodiments, the formatter enriches the one or more event message frame(s). In some embodiments, the formatter does not care about schema, schema validation, and schema translation. In some embodiments, the formatter fetches all data from the cache database and enhances the one or more event message frame(s). In some embodiments, the classifier classifies the filtered data. In some embodiments, the router send the classified enriched event message frame(s) downstream. In some embodiments, the user is notified of the newly classified enriched event message frame(s). In some embodiments, the user is notified via user interface 518. In some embodiments, the user is notified wirelessly via a mobile device.

Figure 4:
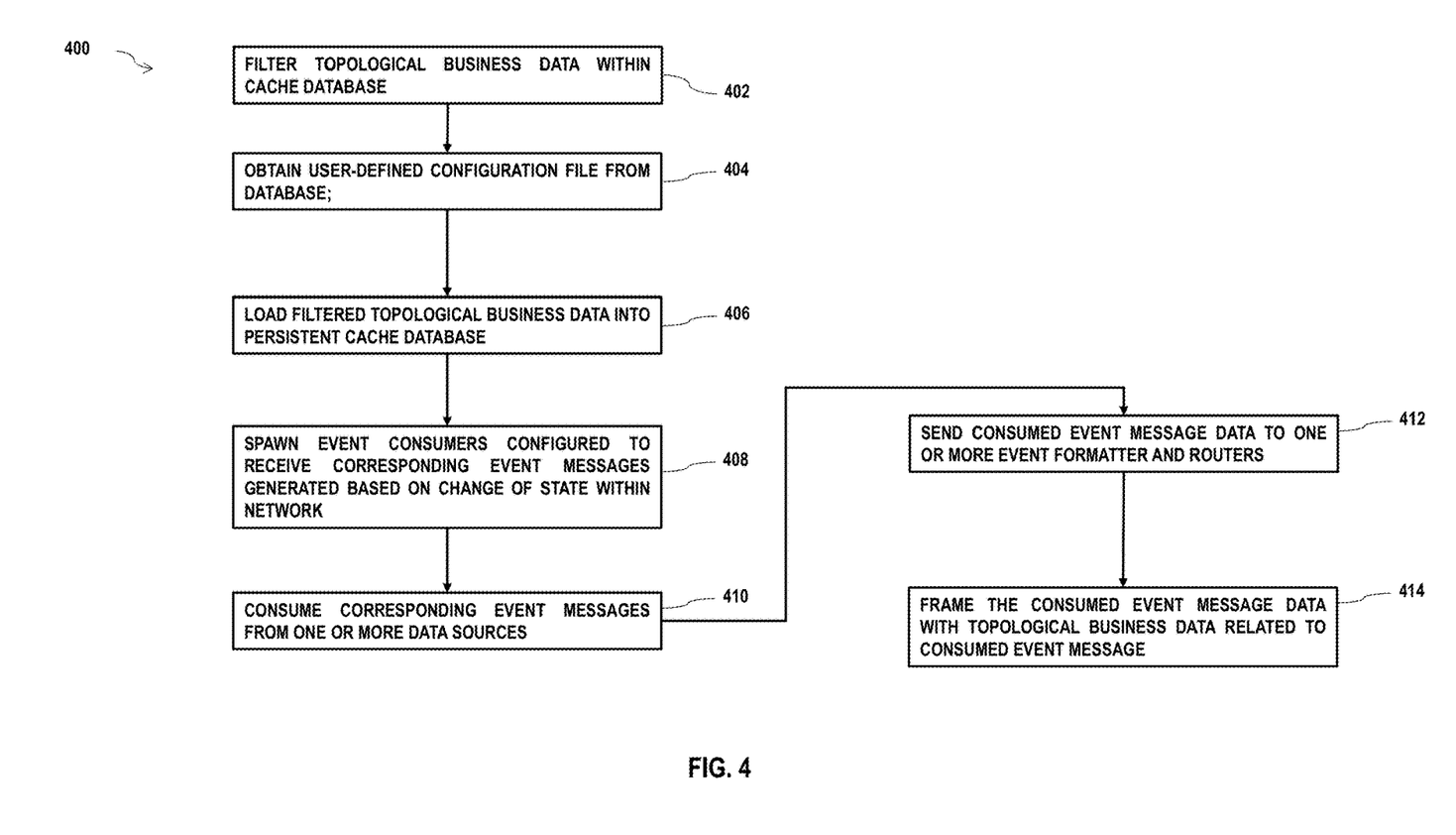
FIG. 4 is a flow diagram for a method of enhancing event message frame(s), in accordance with some embodiments.

FIG. 4 is a flow diagram for a method of enhancing event message frame(s) 400, in accordance with some embodiments.

Method 400 is configured to be used to enhance event message frame(s). Method 400 is configured to be used in a CPE, such as event enricher system 100, to handle multiple data sources and multiple data source types. The sequence in which the operations of method 400 are depicted in FIG. 4 is for illustration only; the operations of method 400 are capable of being executed in sequences that differ from that depicted in FIG. 4. In some embodiments, operations in addition to those depicted in FIG. 4 are performed before, between, during, and/or after the operations depicted in FIG. 4.

In some embodiments, one or more of the operations of method 400 are a subset of operations of a method enhancing event message frame(s). In various embodiments, one or more of the operations of method 400 are performed by using one or more processors, e.g., a processor 502 discussed below with respect to data adaptor processing circuitry 500 and FIG. 5.

At operation 402 of method 400, a user-defined filter filters, based upon a user policy, topological business data within a cache database, such as cache database 122. In some embodiments, the user-defined policy takes action on entities that fulfill the filters where the filters have attributes. In some embodiments, these attributes include domain, location, and entity types. Process flows from operation 402 to operation 404.

At operation 404 of method 400, a configuration parser module, such as configuration parser module 108 obtains a user-defined configuration file from a database. Process flows from operation 404 to operation 406.

At operation 406 of method 400, an Eager cache load module such as Eager cache load module 106, loads the filtered topological business data into a persistent cache database, such as persistent cache database 122. Process flows from operation 406 to operation 408.

At operation 408 of method 400, an invoke worker module, such as invoke worker module 110, spawns, based on the user-defined configuration file, event consumers, such as event consumers 130, configured to receive corresponding event messages generated based on a change of state within a network. Process flows from operation 408 to operation 410.

At operation 410 of method 400, event consumer module(s), such as event consumer modules 130, consume the corresponding event messages from one or more data sources. Process flows from operation 410 to operation 412.

At operation 412 of method 400, event consumer module(s), such as event consumer module(s) 130, send consumed event message data to one or more event formatter and routers, such as event formatter and router module 132. Process flows from operation 412 to operation 414.

At operation 414 of method 400, event formatter and router module, such as event formatter and router 132, frames the consumed event message data with the topological business data related to the consumed event message.

FIG. 5 is a block diagram of event enricher processing circuitry 500 in accordance with some embodiments. In some embodiments, event enricher processing circuitry 500 is a general purpose computing device including a hardware processor 502 and a non-transitory, computer-readable storage medium 504. Storage medium 504, amongst other things, is encoded with, i.e., stores, computer program code 506, i.e., a set of executable instructions such as a correlation engine and policy manager. Execution of instructions 506 by hardware processor 502 represents (at least in part) an event enricher tool which implements a portion or all of the methods described herein in accordance with one or more embodiments (hereinafter, the noted processes and/or methods).

Hardware processor 502 is electrically coupled to a computer-readable storage medium 504 via a bus 508. Hardware processor 502 is further electrically coupled to an I/O interface 510 by bus 508. A network interface 512 is further electrically connected to processor 502 via bus 508. Network interface 512 is connected to a network 514, so that processor 502 and computer-readable storage medium 504 are capable of connecting to external elements via network 514. processor 502 is configured to execute computer program code 506 encoded in computer-readable storage medium 504 in order to cause event enhancer processing circuitry 500 to be usable for performing a portion or all of the noted processes and/or methods, such as methods 300 and 400, of FIGS. 3 and 4. In one or more embodiments, processor 502 is a central processing unit (CPU), a multi-processor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-memory (ROM), a rigid magnetic disk, and/or an optical disk. In one or more embodiments using optical disks, computer-readable storage medium 504 includes a compact disk-read memory (CD-ROM), a compact disk-read/write (CD-R/W), and/or a digital video disc (DVD).

In one or more embodiments, storage medium 504 stores computer program code 506 configured to cause event enhancer processing circuitry 500 to be usable for performing a portion or all of the noted processes and/or methods. In one or more embodiments, storage medium 504 further stores information, such an event enhancer algorithm which facilitates performing a portion or all of the noted processes and/or methods.

Data adaptor processing circuitry 500 includes I/O interface 510 that is like user input 112. I/O interface 510 is coupled to external circuitry. In one or more embodiments, I/O interface 510 includes a keyboard, keypad, mouse, trackball, trackpad, touchscreen, cursor direction keys and/or other suitable I/O interfaces are within the contemplated scope of the disclosure for communicating information and commands to processor 502.

Event enhancer processing circuitry 500 further includes network interface 512 coupled to processor 502. Network interface 512 allows data adaptor processing circuitry 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more event enhancer processing circuitry 500.

Data adaptor processing circuitry 500 is configured to receive information through I/O interface 510. The information received through I/O interface 510 includes one or more of instructions, data, and/or other parameters for processing by processor 502. The information is transferred to processor 502 via bus 508. Event enhancer processing circuitry 500 is configured to receive information related to a UI through I/O interface 510. The information is stored in computer-readable medium 504 as user interface (UI) 518.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. In some embodiments, a system includes processing circuitry and a memory connected to the processing circuitry. The memory is configured to store executable instructions that, when executed by the processing circuitry, facilitate performance of operations. The operations include filtering, based upon business logic, business data within a cache database. Converting the filtered business data into a data model. Loading the data model to a persistent cache database. Obtaining event messages from a data source, where the event messages are generated by one or more state changes within a network operatively connected to the system. Obtaining, for an event message, event-related data from the data model, where the event-related data is topologically related to the event message. Combining the event message with the event-related data from the data model. Framing the event message with the event-related data; and route the frame according to a user-defined configuration file. Other embodiments of this aspect include corresponding computer systems, apparatus, and computer programs recorded on one or more computer storage devices, each configured to perform the actions of the methods.

Implementations may include one or more of the following features. The system where the processing circuitry is configured to execute the instructions for filtering the cache database as a background operation. The processing circuitry is configured to execute the instructions for converting the filtered business data into the data model based on the business logic that is user defined. The processing circuitry is configured to execute the instructions for modifying the business logic during performance of the operations by the processing circuitry and storing the modified business logic in the persistent cache database. The processing circuitry is configured to execute the instructions including applying the modified business logic to real-time event frames. The processing circuitry is configured to execute the instructions for loading the cache database in eager mode. The processing circuitry is configured to execute the instructions loading the cache database in lazy mode. The processing circuitry is configured to execute the instructions for obtaining the event messages as streams through data sources. Implementations of the described techniques may include hardware, a method or process, or computer software on a computer-accessible medium.

In some embodiments, a method includes filtering, based upon a user policy, topological business data within a cache database. Obtaining a user-defined configuration file from a database. Loading the filtered topological business data into a persistent cache database. Spawning, based on the user-defined configuration file, event consumers configured to receive corresponding event messages generated based on a change of state within a network. Consuming, by the event consumers, the corresponding event messages from one or more data sources. Sending, by the event consumers, consumed event message data to one or more event formatter and routers. Framing, by the one or more formatter and routers, the consumed event message data with the topological business data related to the consumed event message. Other embodiments of this aspect include corresponding computer systems, apparatus, and computer programs recorded on one or more computer storage devices, each configured to perform the actions of the methods.

Implementations may include one or more of the following features. The method where the configuration file specifies configuration information that includes one or more of data sources, parameters for framing the event messages and the topological business data, and data sinks. The method includes classifying the consumed event message data based on the configuration file. The frame includes a portion of the consumed event data and the topological business data. The method includes formatting one or more event frames into a readable format for a data sink to consume. The framing the consumed event includes adding additional data to one or more event messages based on the topological business data's relation to the one or more event messages. The method includes routing the framed event message data to a messaging queue. Implementations of the described techniques may include hardware, a method or process, or computer software on a computer-accessible medium.

In some embodiments, a device includes a non-transitory, tangible computer readable storage medium storing a computer program, where the computer program contains instructions that when executed, cause the device to perform operations. The operations include loading a cache database with business logic stored in a master database. Converting business data into a data model. Loading the data model into a persistent cache database. Obtaining topological data from the persistent cache database based on a received event message indicating a change of state on a network. Framing one or more event messages with the topological data and distribute the frame based upon a user-defined configuration file. Other embodiments of this aspect include corresponding computer systems, apparatus, and computer programs recorded on one or more computer storage devices, each configured to perform the actions of the methods.

Implementations may include one or more of the following features. The device where executing the instructions further includes filtering, by the cache database, the business data based upon the business logic. A business data layer is filtered, based on filter based parameters to obtain filtered data. The filter based parameters are set by a user. The filtered data is filtered based upon domain, location and entity type. Implementations of the described techniques may include hardware, a method or process, or computer software on a computer-accessible medium.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A system, comprising:
   processing circuitry; and
   a memory connected to the processing circuitry, wherein the memory is configured to store executable instructions that, when executed by the processing circuitry, facilitate performance of operations, comprising:
   filter, based upon business logic, business data within a cache database;
   convert the filtered business data into a data model;
   load the data model to a persistent cache database;
   obtain event messages from a data source, wherein the event messages are generated by one or more state changes within a network operatively connected to the system;
   obtain, for an event message, event-related data from the data model, wherein the event-related data is topologically related to the event message;
   combine the event message with the event-related data from the data model;
   frame the event message with the event-related data; and
   route the frame according to a user-defined configuration file.

2. The system of claim 1, wherein the processing circuitry is configured to execute the instructions for filtering the cache database as a background operation.

3. The system of claim 1, wherein the processing circuitry is configured to execute the instructions for converting the filtered business data into the data model based on the business logic that is user defined.

4. The system of claim 3, wherein the processing circuitry is configured to execute the instructions for modifying the business logic during performance of the operations by the processing circuitry and storing the modified business logic in the persistent cache database.

5. The system of claim 4, wherein the processing circuitry is configured to execute the instructions further comprising: apply the modified business logic to real-time event frames.

6. The system of claim 1, wherein the processing circuitry is configured to execute the instructions for loading the cache database in Eager mode.

7. The system of claim 1, wherein the processing circuitry is configured to execute the instructions loading the cache database in lazy mode.

8. The system of claim 1, wherein the processing circuitry is configured to execute the instructions for obtaining the event messages as streams through data sources.

9. A method, comprising:
   filtering, based upon a user policy, topological business data within a cache database;
   obtaining a user-defined configuration file from a database;
   loading the filtered topological business data into a persistent cache database;
   spawning, based on the user-defined configuration file, event consumers configured to receive corresponding event messages generated based on a change of state within a network;
   consuming, by the event consumers, the corresponding event messages from one or more data sources;
   sending, by the event consumers, consumed event message data to one or more event formatter and routers; and
   framing, by the one or more formatter and routers, the consumed event message data with the topological business data related to the consumed event message.

10. The method of claim 9, wherein the configuration file specifies configuration information that includes one or more of:
    data sources;
    parameters for framing the event messages and the topological business data; and
    data sinks.

11. The method of claim 9, further comprising:
    classifying the consumed event message data based on the configuration file.

12. The method of claim 9, wherein the frame includes a portion of the consumed event data and the topological business data.

13. The method of claim 12, further comprising:
    formatting one or more event frames into a readable format for a data sink to consume.

14. The method of claim 9, wherein the framing the consumed event comprises adding additional data to one or more event messages based on the topological business data's relation to the one or more event messages.

15. The method of claim 9, further comprising:
    routing the framed event message data to a messaging que.

16. A device comprising:
    a non-transitory, tangible computer readable storage medium storing a computer program, wherein the computer program contains instructions that when executed, cause the device to perform operations comprising:
    load a cache database with business logic stored in a master database;
    convert business data into a data model;
    load the data model into a persistent cache database;
    obtain topological data from the persistent cache database based on a received event message indicating a change of state on a network;

frame one or more event messages with the topological data; and distribute the frame based upon a user-defined configuration file.

17. The device of claim 16, wherein executing the instructions further comprises:

filter, by the cache database, the business data based upon the business logic.

18. The device of claim 17, wherein a business data layer is filtered, based on filter based parameters to obtain filtered data.

19. The device of claim 18, wherein the filter based parameters are set by a user.

20. The device of claim 19, wherein the filtered data is filtered based upon domain, location and entity type.

* * * * *